US007611052B2

(12) United States Patent
Gosi et al.

(10) Patent No.: US 7,611,052 B2
(45) Date of Patent: Nov. 3, 2009

(54) BEVERAGE DISPENSING SYSTEM AND METHOD

(76) Inventors: Riccardo Gosi, Via XX Luglio 47, 50020 Panzano in Chianti (IT); Lorenzo Bencista, Vialo Rosa Libri 42, 50022 Grove in Chianti (IT); Richard David Nelson, 34 Glengyle Street, Dunedin (NZ); Stuart Thomas Anderson, 148 Easther Crescent, Dunedin (NZ); Shokit Reeial Ali, 30 Peel Street, Dunedin (NZ)

( * ) Notice: Subject to any disclaimer, the term of this patent is extended or adjusted under 35 U.S.C. 154(b) by 0 days.

(21) Appl. No.: 11/444,701

(22) Filed: May 31, 2006

(65) Prior Publication Data

US 2007/0272742 A1 Nov. 29, 2007

(30) Foreign Application Priority Data

May 26, 2006 (AU) .............................. 2006202231

(51) Int. Cl.
*G06F 7/08* (2006.01)

(52) U.S. Cl. ........................ 235/381; 235/378; 235/383

(58) Field of Classification Search ................. 235/375, 235/380, 381, 378, 383; 705/15; 222/2, 222/129.1

See application file for complete search history.

(56) References Cited

U.S. PATENT DOCUMENTS 5,659,482 A * 8/1997 Warn et al. .................. 700/236
5,753,899 A * 5/1998 Gomm et al. ............... 235/381
5,913,454 A * 6/1999 McHale ......................... 222/2
6,142,371 A * 11/2000 Oneda ........................ 235/380
2005/0125363 A1* 6/2005 Wilson et al. ................. 705/75
2006/0282344 A1* 12/2006 Brown ......................... 705/28

* cited by examiner

*Primary Examiner*—Daniel A Hess
(74) *Attorney, Agent, or Firm*—Abelman, Frayne & Schwab

(57) ABSTRACT

A beverage dispensing system includes serving spouts in fluid connection with inlet pipes locatable within beverage receptacles. The serving spouts have receptacle identifiers and are associated with prices/price groups or points/points groups. Product data sets in computer memory include a product identifier and have associated receptacle identifiers and prices or points. A reading device calculates value from a stored value device. Stored value device data sets in computer memory include stored value device identifiers and stored values. A user selection component obtains a serving spout selection, and dispenses a volume of beverage from the selected serving spout by comparing the prices or points associated with the selected serving spout and the stored value. User data sets and transaction data sets in computer memory include user identifiers, stored value device identifiers, stored value device identifiers, and receptacle identifiers.

17 Claims, 3 Drawing Sheets

BEVERAGE DISPENSING SYSTEM AND METHOD

BACKGROUND OF THE INVENTION

1. Field of the Invention

The invention relates to a beverage dispensing system and a method of dispensing a beverage. The invention is primarily concerned with wine but includes other beverages such as spirits and edible oils also. The system described below enables monitoring and reporting on transactions involving beverages.

2. Description of the Related Art

When purchasing beverages such as wine from cellar doors, from retail premises, or from restaurants and bars it is common to have the option of purchasing a quantity less than a bottle for example a taste, half glass or full glass. The benefit of purchasing wine by the glass or taste enables the purchaser to sample small inexpensive quantities of the beverage prior to purchase at a cellar door or retail premises. If the beverage is satisfactory to the consumer the consumer can then purchase a bottle or several bottles of the beverage.

In a restaurant or bar, wine by the glass sales increase turnover and are generally more profitable than bottle sales. However most restaurants and bars have typically only offered a limited range of wines by the glass. This is because of the problems and risks associated with opening wine for sale by the glass or taste. One problem is that wine that is not consumed oxidizes in the bottle and is wasted. Furthermore staff over-pouring glasses and stock losses through stock theft both reduce profit margins in the beverage.

U.S. published patent application number US 2005/0150549 A1, which is incorporated herein by reference in its entirety, describes a wine dispensing system enabling bottles of wine to be kept in a vertical position and in which an inert gas is used to reduce the effects of wine oxidation. The system in one embodiment is activated by a user through a chip card and is controlled by software. In some embodiments the system includes a liquid crystal or luminous LED display showing the cost of each quantity available for sale.

It would be particularly desirable to provide monitoring and reporting on transactions involving the beverages.

BRIEF SUMMARY OF THE INVENTION

The invention provides a beverage dispensing system having a plurality of serving spouts in fluid connection with respective inlet pipes. The inlet pipes are locatable within respective beverage receptacles. The serving spouts have respective receptacle identifiers and are associated with respective prices/price groups or points/points groups.

A plurality of product data sets are maintained in computer memory. The product data sets include a product identifier and have associated respective receptacle identifiers and price(s) or points.

A reading device is configured to calculate a monetary or points value at least partly from a stored value device, the stored value device having a stored value device identifier. A plurality of stored value device data sets are maintained in computer memory. The stored value device data sets include respective stored value device identifiers and respective stored values.

A user selection component is configured to obtain from a user a serving spout selection. The component is also configured to dispense a volume of beverage from the selected serving spout based on a comparison between the price(s) or points associated with the selected serving spout and the stored value.

The system also includes a plurality of user data sets and a plurality of transaction data sets maintained in computer memory. The user data sets include respective user identifiers and stored value device identifiers. The transaction data sets include respective stored value device identifiers and receptacle identifiers.

The invention provides a related method for dispensing a beverage.

The term "comprising" as used in this specification and claims means "consisting at least in part of". That is to say, when interpreting statements in this specification and claims which include "comprising", the features prefaced by this term in each statement all need to be present but other features can also be present. Related terms such as "comprise" and "comprised" are to be interpreted in a similar manner.

BRIEF DESCRIPTION OF THE SEVERAL VIEWS OF THE DRAWINGS

Preferred embodiments of the invention are disclosed hereinbelow with reference to the drawings, wherein.

DETAILED DESCRIPTION OF THE INVENTION

Figure 1:
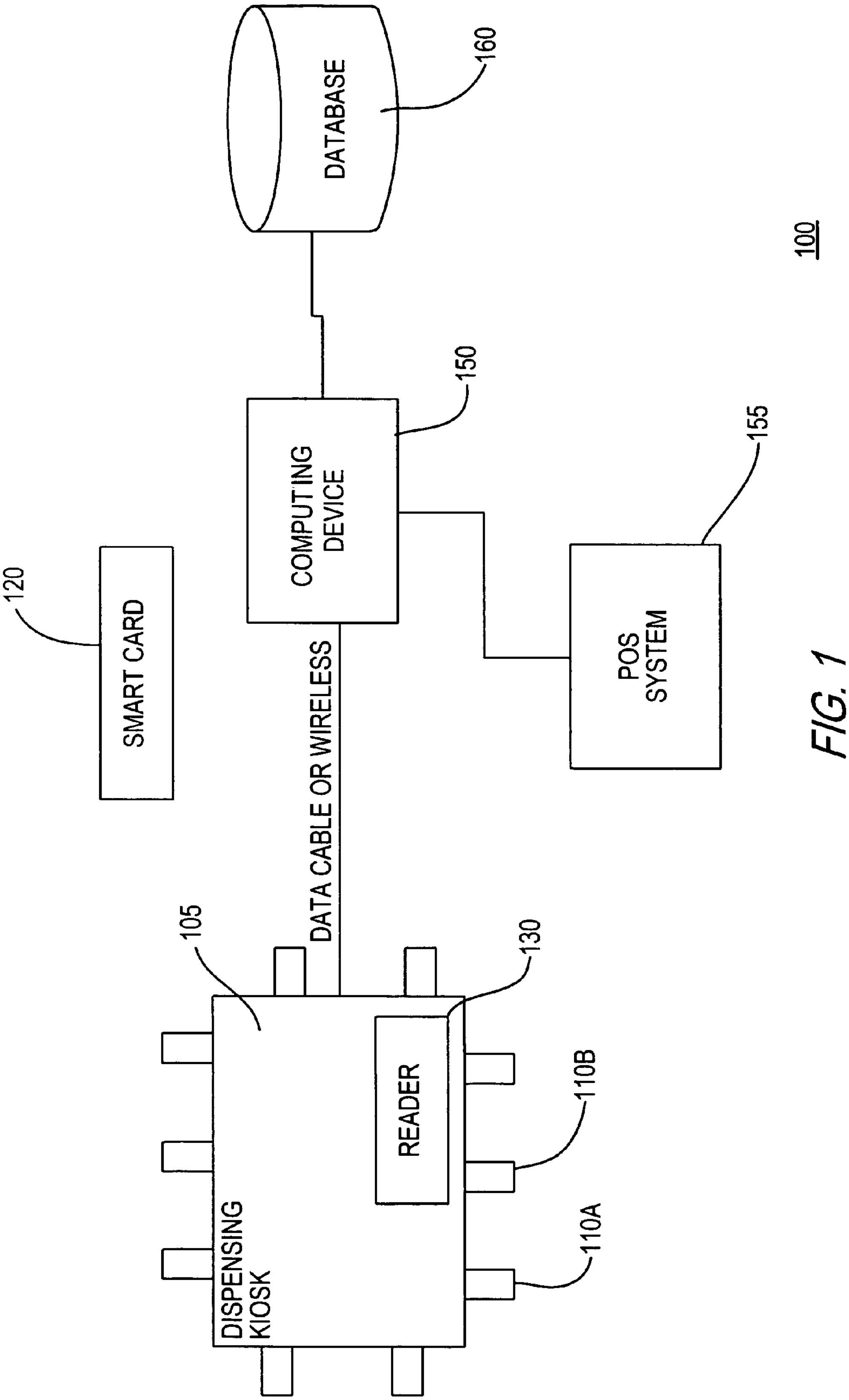
FIG. 1 is a block diagram of a preferred form of the beverage dispensing system of the present invention.

FIG. 1 shows a preferred form beverage dispensing system 100. The system 100 is particularly suited to the dispensing of beverages such as wine. It will be appreciated that the same system could be used to dispense other beverages such as spirituous liquors and edible oils. The system 100 typically includes one or more dispensing kiosks, one example of which is indicated at 105. The dispensing kiosk 105 is positioned in an area accessible to users. The users are either staff or customers.

The kiosk 105 includes several serving spouts two of which are indicated at 110A and 110B. The serving spouts 110A, 110B are preferably each in fluid connection with respective inlet pipes (not shown). The individual inlet pipes are removably insertable into wine bottles through the open mouth of each bottle while the bottle is in a substantially vertical upright position.

Customers purchase a smart card 120 which can be loaded with a monetary value, points value, or credit limit selected by the user. Alternatively customers or staff can be given a smart card 120 with a maximum value credit limit set by the operator with payment made at the completion of the wine service.

The smart cards 120 each have a unique ID number. They can be reformatted, recharged and reused with a new unique smart card ID created each time they are reformatted. They can preferably be customized and printed on both sides to include brand and graphic design. The smart cards 120 typically operate in one of two formats, either cumulative in which value is added as the smart card 120 is used to serve wine or deductive where the smart card 120 is preloaded with value that reduces as the wine is served.

There are several operational formats envisaged for the smart card 120. One such format, referred to as a Normal Card, uses the deductive operation method and is used by customers who prepay for a preloaded smart card 120 value. The value of each wine served is deducted from the smart card 120 as it is used. A monetary or points deposit value is preferably programmed onto the smart card 120 and the deposit and any unused value is refunded when the customer returns the smart card 120.

Figure 2:
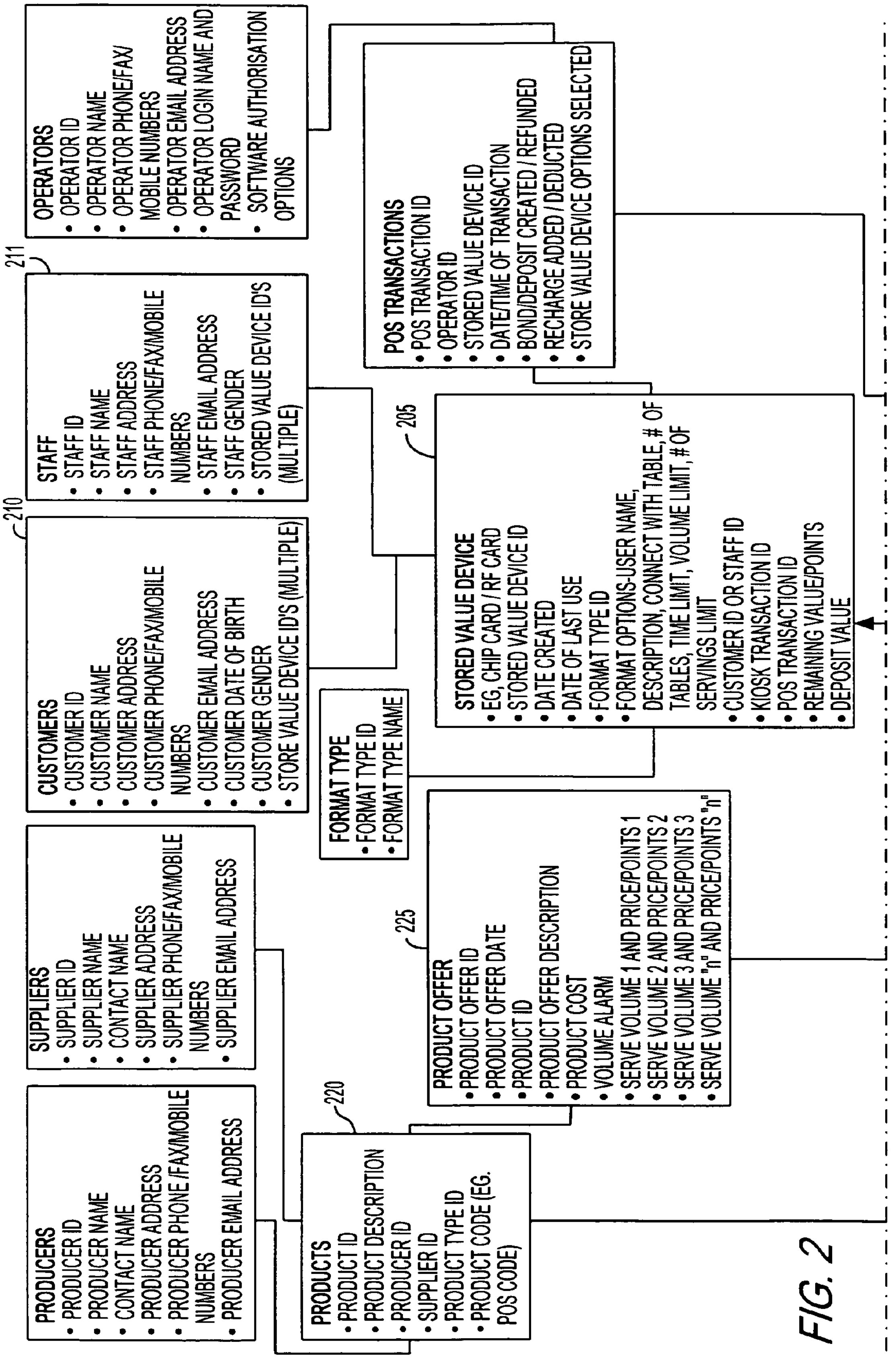
FIG. 2 is a preferred form of a database schema for use with the beverage dispensing system.
Figures 1, 2:
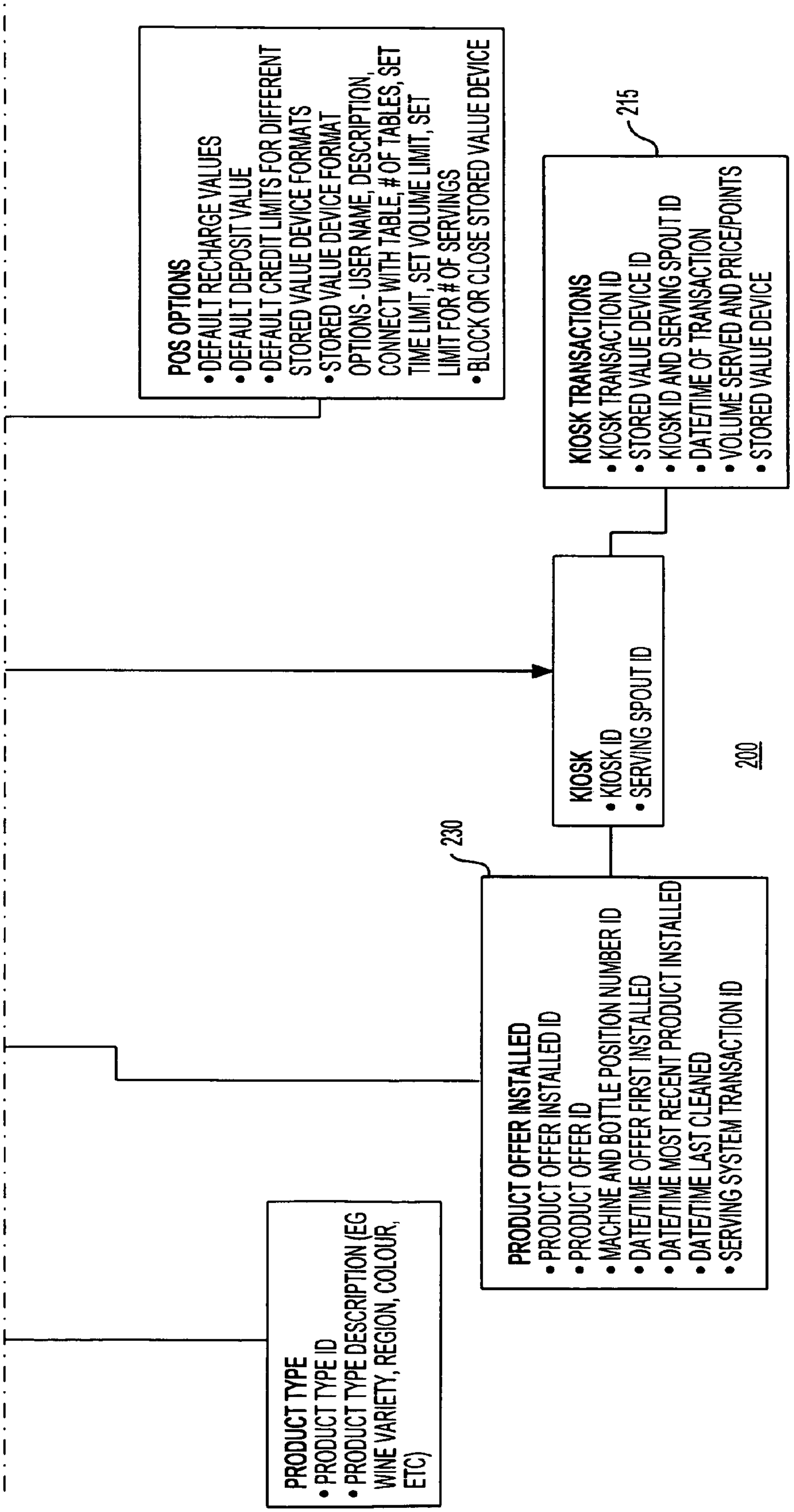

Another smart card format, referred to as a Loyalty Card, is linked to customers whose names and details are recorded in the database 160 in table 210, shown in FIG. 2, via software. Similar to the smart card 120 described above this smart card 120 uses the deductive method. When used with database software described below the smart card 120 manages the customers' data and records details of all the wines served and all transactions of the smart card 120 or multiple smart cards 120 that can be linked to the same customer. This creates a profile of the customers' wine preferences and habits and enables targeted direct marketing, customized discounts or special promotions to be given to selected customers.

Another smart card format, referred to as a VIP Card, allows a credit value up to a variable limit set by the operator to be programmed onto the smart card 120. This is optionally used with software that manages an account and sends monthly accounts to the smart card 120 holders.

A further smart card format, referred to as a Restaurant Card, can be used in a restaurant or bar with one or more smart cards linked to a table account for use by one or more customers at the table. Alternatively this smart card 120 format can be linked to the staff whose names and details are recorded in the database 160 in table 211, shown in FIG. 2, via software. This format uses the cumulative operation method and the initial smart card 120 value can be set to zero. This is optionally used with software that manages an account to record the increasing value as each wine is served by each smart card 120, up to a variable credit limit selected by the operator.

Other formats include a smart card format, referred to as a Service Card, used by staff to clean the system or serve themselves wine. A further smart card format, referred to as a Technical Card, is used by staff to raise and lower the bottle to install it in the dispensing system 100.

All smart card 120 formats can optionally be programmed with a volume limit, and/or a limit to the number of servings, and/or an operational time limit after which they will expire. The limits can be varied and set by the operator. When the limits are reached the smart card 120 will not function in the dispensing system 100 until they are reset by the operator.

In some embodiments every smart card 120 is associated with the installation in which the smart card 120 is issued. One example is that a smart card 120 could be created in one installation and could be used in a chain of related installations. In this case the smart card 120 would not only have a unique ID number, which is preferably linked to a user, but it would also have a unique installation ID number and a unique chain ID number.

Having obtained a smart card 120, the user inserts the smart card 120 into a card reader 130 to activate the serving spouts 110A, 110B of the kiosk 105. If no smart card 120 is inserted, or if all the value of the smart card 120 has been used, or if the credit limit has been reached, or if any of the volume, serving or time limits on the smart card 120 have been reached, the dispensing system 100 will not be activated by the smart card 120 and no wine can be served.

In one embodiment the system is configured to enable smart card 120 blocking. If a smart card 120 has been lost or if it is intended to stop service to a particular smart card 120, that smart card 120 can be blocked within the system. If a blocked smart card 120 is inserted into the card reader, the dispensing system 100 will not be activated and no wine will be served.

The serving spouts 110A, 110B are preferably each identified with respective receptacle identifiers. The serving spouts 110A, 110B are also preferably associated with respective prices or price groups, or points or point groups. In one embodiment the dispensing system 100 is configured to deliver a consistent volume of wine per serving for example a tasting sample or a half glass or a full glass of wine. With this configuration a price or points value for the tasting sample or half or full glass of wine is defined and associated with at least one of the serving spouts 110A, 110B delivering that wine. The price or points value will of course depend on the volume served and the brand of wine dispensed and can be affected by any special promotions or offers available at the time of service.

In other embodiments the kiosk 105 is configured to deliver one of three set quantities of wine for example a taste, a half glass or a full glass. The customer selects both the wine and the volume from one of the three predefined volumes. Where more than one volume is available for service at least one of the serving spouts 110A, 110B has associated with it a price or points group representing the price or points value of a taste, the price or points value of a half glass and the price or points value of a full glass. In some embodiments at least some and preferably all of the serving spouts 110A, 110B have associated with them individual LCD or LED displays showing the price, prices or points value of each serving volume from each serving spout 110A, 110B.

The user selects the wine they wish to serve and holds a glass to at least one of the serving spouts 110A, 110B. The user activates a user selection component for example a button or similar positioned near a serving spout 110A, 110B. The user selection component obtains from the customer the serving spout 110A, 110B selection and then dispenses a volume of the wine from the selected serving spout 110A, 110B. As the wine is served the price or points value is automatically deducted from the smart card 120. It is envisaged that a comparison is made between the price, prices or points associated with the selected serving spout 110A, 110B and the calculated monetary or points value. If the selected wine exceeds the amount of value stored on the smart card 120 then the volume dispensed will be a proportion of the selected volume.

When the user has finished wine consumption the user returns the smart card 120. If a deductive smart card 120 format has been used the operator may refund any unused value and any deposit. If a cumulative smart card 120 format has been used then the operator can charge the user for the value of wine consumed.

The smart card 120 can then be reformatted, recharged and reused with a new unique smart card ID created.

As shown in FIG. 1 the system also includes a computing device 150 preferably interfaced to a point of sale (POS) system 155 and a database 160. Software installed and operating on the computing device 150 captures data about every wine service transaction, recording what was served, what volume, when and by which smart card 120. The database 160 records every transaction including the wines served of each supplier, each producer and each user.

The software also monitors every serving spout 110A, 110B in every kiosk 105 to record what wine is installed at each serving spout 110A, 110B, when each bottle was installed, how long that particular wine has been installed, how much wine is left in the current bottle and when the serving spouts 110A, 110B were last cleaned. The software automatically backs up all data and enables data about a partly consumed bottle to be retained and re-linked to any bottles that are removed from a serving spout 110A, 110B and later reinstalled into the dispensing system 100.

This provides a complete profile of all wine served from each kiosk 105, each serving spout 110A, 110B and by each user. It enables monitoring and control of all wine served, whether it is served by staff or customers.

It is also envisaged that customers earn loyalty points through purchases of wine or merchandise that can be redeemed for value loaded onto the smart card 120.

FIG. 2 shows a typical database schema 200 for the organization of data within the database 160. The database schema 200 is presented as a relational database having a series of tables and table relationships. It will be appreciated that other formats for databases are envisaged for example a simple flat file, spreadsheet or other format.

The database 160 includes a stored value device table 205. This table 205 stores a plurality of data sets specific for each smart card, magnetic stripe card, radio frequency (RF) card or bar coded card. The format includes at least a stored value device identifier and a smart card value representing a monetary or points value stored on the smart card 120. The table 205 may also include a date created field and a date of last use field as well as a deposit value. The table also includes a user identifier, either customer or staff, as well as other data shown in FIG. 2.

As described above, the Restaurant Card format links one or more smart cards with a table account. To support this format, table 205 could include a table number to link the card with a table. This table number could be a sequentially assigned number in a range.

The user identifier provides a link to the customer table 210 or staff table 211. The customer table 210 or staff table 211 enables the storing of a plurality of customer or staff data sets. These customer or staff data sets each include at least a customer or staff identifier and one or more stored value device identifiers. As is shown in FIG. 2 the customer table 210 or staff table 211 can also include a name, address, contact details, gender and date of birth of a customer or staff, as well as other data shown in FIG. 2.

The database also includes a plurality of transaction data sets. The format of these data sets are indicated as table 215. Table 215 includes a kiosk transaction identifier, a stored value device identifier and a kiosk 105 and serving spout 110A, 110B identifier. The transaction also includes a date and time of the transaction, the volume served and price or points and the value of the stored value device at the time of the transaction, as well as other data shown in FIG. 2.

The database also includes a series of product data sets. These are facilitated by a products table 220. Table 220 includes a product identifier and optionally includes identifiers for the producer of the wine and/or the supplier of the wine. A related product offer table 225 records the cost of individual products at a product offer date and for a preset or variable volume. The product offer table 225 is linked to the kiosk transactions table 215 by a product offer installed table 230 which identifies which product offer is installed in which kiosk 105 in which serving spout 110A, 110B. The product data sets are shown in FIG. 2 as being implemented essentially in the combination of tables 220, 225 and 230, as well as other data shown in FIG. 2.

Software installed on the computing device 150 monitors all kiosks 105 and all serving spouts 110A, 110B which are connected either by data cable or wirelessly to the computing device.

Every wine serving transaction from each kiosk 105 and each serving spout 110A, 110B by each smart card 120, which is preferably linked to each user, is recorded in database 160. This enables detailed monitoring, control and reporting of wine served by staff and customers.

The software shows each kiosk 105 and each serving spout 110A, 110B to show what wine is installed, what date and time it was installed, how long the product offer has been installed, what volume of wine is left in the currently installed bottle and when the serving spouts 110A, 110B were last cleaned. Warning alarms are activated and displayed when the volume remaining in a bottle is becoming low or is now empty.

Reports can be generated, viewed, printed, exported and graphed either directly via the computing device 150 or via password protected remote internet access to query the database 160.

Reports can be created covering any time period and include:

1. Detailed profiles of each customer's transaction history to create a profile of what wine was consumed, what volume, what value and when. These profiles can also be queried based on the customer's age or gender to create demographic profiles. Operators can determine the income and profit from each customer. Targeted marketing promotions can be made to customers knowing their specific wine preferences. Targeted promotions can be made to reward the best customers or attract back infrequent customers. These promotions can be emailed directly to customers via the email plug-in included in the software.

2. Detailed profiles of each staff transaction history to create a profile of what wine was served, what volume, what value and when. Operators can manage the sales performance of the staff to identify over or under performing staff and create incentive programs to increase sales and profit. A correlation can be made with the wine served and the POS transactions to identify any issues of theft.

3. Detailed profiles for producers and/or suppliers about each of their wines in their portfolio—what was served, the volumes served, the value and to which user. In retail and cellar door installations this consumption data can then be correlated to POS data on actual purchases of bottled wine. Operators can determine which producer's and/or supplier's wines have the highest consumption and are the most profitable.

4. Analysis of each individual wine to identify the most profitable wines, the most popular wine brands, the most popular wine types and which users have served each wine.

5. Lists of all customers, staff, suppliers, producers, stored value devices, products and product offers with all related details.

6. Reports for the overall financial performance of the installation to show the total value loaded onto the stored value device, the total value and volume of consumption, the total value of deposits, the total value of refunds and the total profit.

7. Reports for each customer of their individual wine serving transactions which can be printed at the POS receipt printer.

8. Reports on each kiosk 105 and each serving spout 110A, 110B to show the history of wine serving transactions from each location. This data can be used to analyze the most popular physical locations within the dispensing system 100.

9. Log reports on which operators have used the software and the POS transactions they have implemented.

The foregoing describes the invention including preferred forms thereof. Modifications and improvements as would be obvious to those skilled in the art are intended to be incorporated in the scope hereof as defined in the accompanying claims.

What is claimed is:

1. A beverage dispensing system comprising:

a kiosk including:

a plurality of serving spouts in fluid connection with respective inlet pipes, the inlet pipes locatable within respective beverage receptacles, the serving spouts having respective receptacle identifiers and associated with respective prices/price groups or points/points groups; and a card reading device configured to read a stored value device shaped as a portable card with a portable memory storing a stored monetary or points value associated with a beverage, and to calculate a current monetary or points value at least partly from the stored monetary or points value associated with the beverage in the portable memory on the stored value device, the stored value device having a stored value device identifier;

a plurality of product data sets maintained in computer memory, the product data sets including a product identifier and having associated respective receptacle identifiers and price(s) or points;

a plurality of stored value device data sets maintained in computer memory, the stored value device data sets including respective stored value device identifiers and respective stored values, including at least the monetary or points value associated with at least the beverage obtained from the portable memory of the portable card;

a user selection component configured to obtain from a user a serving spout selection and to dispense a volume of beverage from the selected serving spout based on a comparison between the price(s) or points associated with the selected serving spout and the stored value;

a plurality of user data sets maintained in computer memory, the user data sets including respective user identifiers corresponding to at least one portable card and stored value device identifiers associated with the at least one monetary or points value of the at least one beverage; and a plurality of transaction data sets maintained in computer memory, the transaction data sets including respective stored value device identifiers and receptacle identifiers.

2. A beverage dispensing system as claimed in claim 1 wherein the user selection component is configured to obtain from a user a volume selection and to dispense the selected volume of beverage from the selected serving spout based on a comparison between the price or points associated with the selected volume from the selected serving spout and the calculated monetary or points value.

3. A beverage dispensing system as claimed in claim 2, configured to enable a user profile to be maintained in computer memory of user product preferences, wherein:

at least some of the user data sets are associated with at least some of the transaction data sets through respective common stored value device identifiers; and at least some of the transaction data sets are associated with at least some of the product data sets through respective common receptacle identifiers.

4. A beverage dispensing system as claimed in claim 3 wherein the user selection component deducts the price(s) or points from the stored value.

5. A beverage dispensing system as claimed in claim 3 wherein the user selection component adds the price(s) or points to the stored value up to a predetermined credit limit.

6. A beverage dispensing system as claimed in claim 3 wherein the user is a customer, the user data sets stored in a customer table.

7. A beverage dispensing system as claimed in claim 3 wherein the user is a staff member, the user data sets stored in a staff table.

8. A beverage dispensing system as claimed in claim 2 configured to enable a table account to be maintained in computer memory, wherein:

at least some of the user data sets are associated with at least some of the transaction data sets through respective common stored value device identifiers;

at least some of the stored value device data sets are associated with respective table identifiers; and at least some of the transaction data sets are associated with at least some of the product data sets through respective common receptacle identifiers.

9. A beverage dispensing system as claimed in claim 8 wherein the user selection component adds the price(s) or points to the stored value up to a predetermined credit limit.

10. A beverage dispensing system as claimed in claim 1, configured to enable a user profile to be maintained in computer memory of user product preferences, wherein:

at least some of the user data sets are associated with at least some of the transaction data sets through respective common stored value device identifiers; and at least some of the transaction data sets are associated with at least some of the product data sets through respective common receptacle identifiers.

11. A beverage dispensing system as claimed in claim 10 wherein the user selection component deducts the price(s) or points from the stored value.

12. A beverage dispensing system as claimed in claim 10 wherein the user selection component adds the price(s) or points to the stored value up to a predetermined credit limit.

13. A beverage dispensing system as claimed in claim 10 wherein the user is a customer, the user data sets stored in a customer table.

14. A beverage dispensing system as claimed in claim 10 wherein the user is a staff member, the user data sets stored in a staff table.

15. A beverage dispensing system as claimed in claim 1 configured to enable a table account to be maintained in computer memory, wherein:

at least some of the user data sets are associated with at least some of the transaction data sets through respective common stored value device identifiers;

at least some of the stored value device data sets are associated with respective table identifiers; and at least some of the transaction data sets are associated with at least some of the product data sets through respective common receptacle identifiers.

16. A beverage dispensing system as claimed in claim 15 wherein the user selection component adds the price(s) or points to the stored value up to a predetermined credit limit.

17. A method of dispensing beverages from a plurality of serving spouts in fluid connection with respective inlet pipes, the inlet pipes locatable within respective beverage receptacles, the serving spout having respective receptacle identifiers and associated with respective prices/price groups or points/points groups, the method comprising the steps of:

providing a kiosk with the plurality of serving spouts and a card reading device;

maintaining a plurality of product data sets in computer memory, the product data sets including a product identifier and having associated respective receptacle identifiers and price(s) or points;

obtaining, through reading a stored value device shaped as a portable card using the card reading device at the kiosk, a current monetary or points value associated with a beverage at least partly from the stored value device shaped as the portable card with a portable memory having the stored monetary or points value associated with the beverage, the stored value device having a stored value device identifier corresponding to the monetary or points value associated with the beverage;

maintaining a plurality of stored value device data sets in computer memory, the stored value device data sets including respective stored value device identifiers and respective stored values, including at least the monetary or points value associated with at least the beverage obtained from the portable memory of the portable card;

obtaining from a user a serving spout selection;

dispensing a volume of beverage from the selected serving spout based on a comparison between the price(s) or points associated with the selected serving spout and the stored value;

maintaining a plurality of user data sets in computer memory, the user data sets including respective user identifiers corresponding to at least one portable card, and stored value device identifiers associated with the at least one monetary or points value of the at least one beverage; and maintaining a plurality of transaction data sets in computer memory, the transaction data sets including respective stored value device identifiers and receptacle identifiers.

* * * * *